March 8, 1938.　　　　F. E. WOLCOTT　　　　2,110,252
DISPENSING DEVICE
Filed Feb. 6, 1936　　　　2 Sheets-Sheet 1
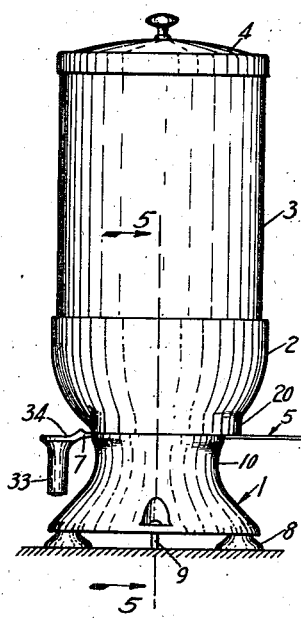
Fig. 1.
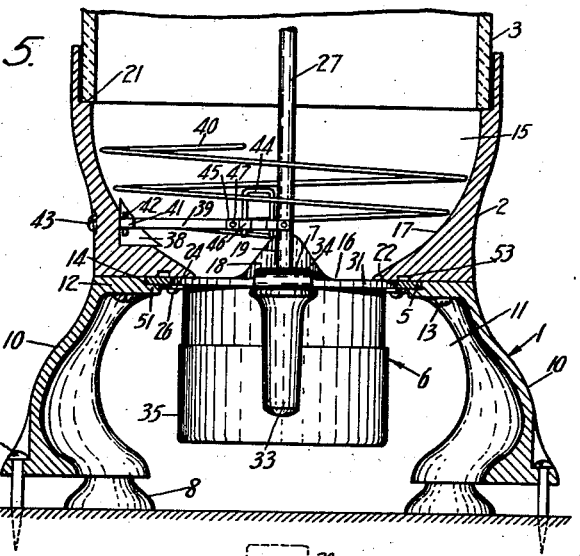
Fig. 5.
Fig. 2.
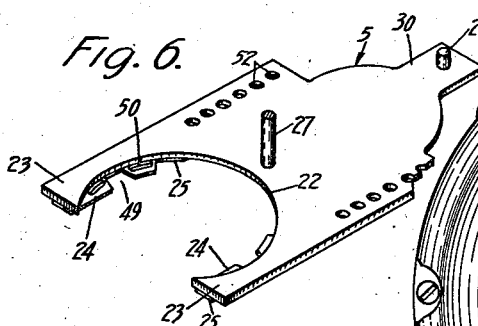
Fig. 6.
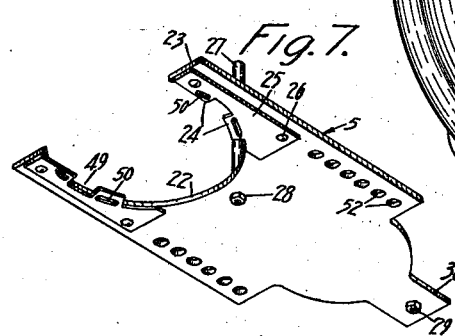
Fig. 7.
INVENTOR
Frank E. Wolcott
By [signature]
ATTORNEY March 8, 1938.  F. E. WOLCOTT  2,110,252
DISPENSING DEVICE
Filed Feb. 6, 1936   2 Sheets-Sheet 2
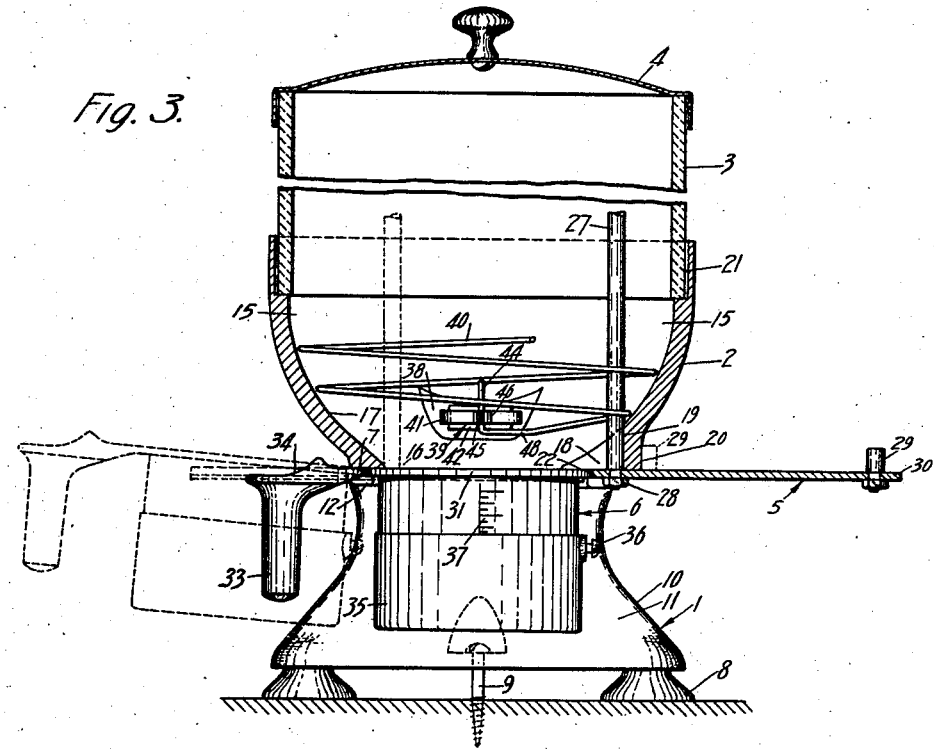
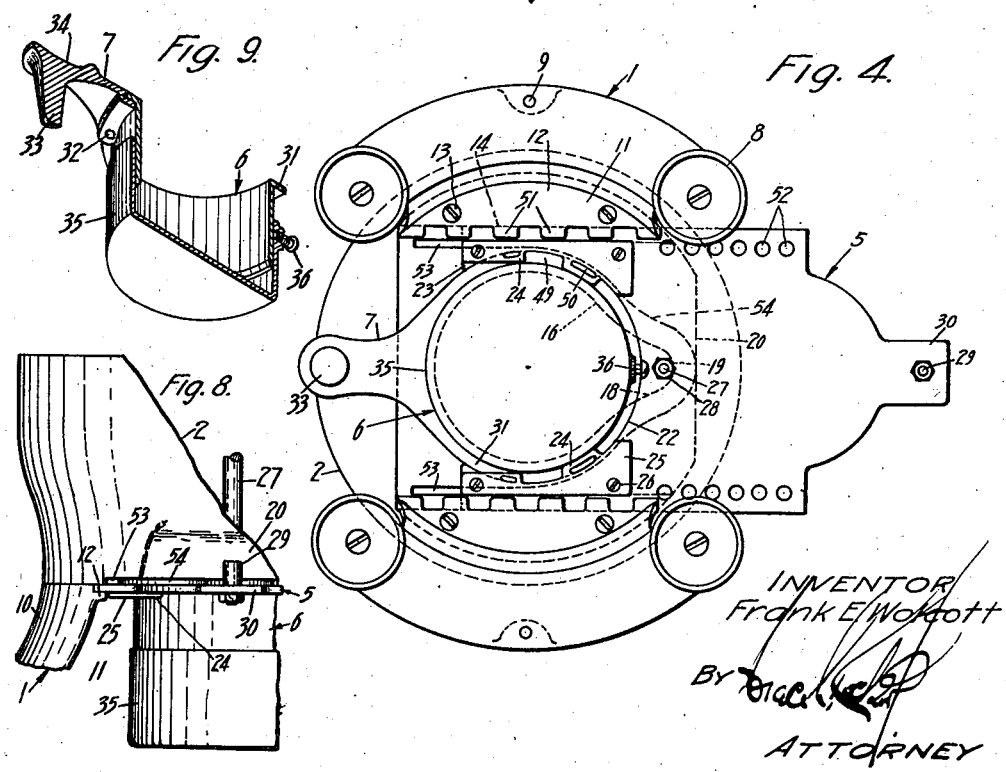

Patented Mar. 8, 1938

2,110,252

UNITED STATES PATENT OFFICE 2,110,252

DISPENSING DEVICE

Frank E. Wolcott, West Hartford, Conn., assignor, by mesne assignments, to The Silex Company, a corporation of Connecticut Application February 6, 1936, Serial No. 62,656

27 Claims. (Cl. 221—105)

My invention relates to dispensing devices.

It has among its objects to provide an improved dispensing device, and more particularly, one especially adapted to use in connection with dispensing finely ground materials such, for example, as coffee. A further object of my invention is to provide such an improved device wherein, as a result of an improved construction, it is made possible to insure that the device dispenses an equal amount of material at each operation, this in a coffee dispenser being of marked importance in order that a uniform excellence of the subsequently brewed coffee may be maintained. Further objects of my invention include the provision of an improved and readily and quickly operated feeding mechanism having improved provision for insuring a predetermined supply of coffee from the main receptacle or container to a manually removable measuring cup in which the coffee is transferred to the coffee maker or makers. Other objects include the provision of an improved cut-off slide construction beneath the main receptacle and having improved means thereon for receiving the cup and enabling operation of the slide thereby, and also improved means for preventing clogging of the slide despite the tendency of the coffee to find its way onto the various guides and supports. These and other objects and advantages of my improved construction will, however, hereinafter more fully appear.

In the accompanying drawings, I have shown for purposes of illustration one embodiment which my invention may assume in practice.

In these drawings,—

Figure 1 is a side elevation of a coffee dispenser constructed in accordance with my improvement, the same being illustrated in the "in" position of the measuring cup;

Fig. 2 is an enlarged plan view of the construction shown in Fig. 1 with the upper cover and glass removed to facilitate illustration, the slide and cup being shown in full and dotted lines in their opposite positions;

Fig. 3 is a sectional view on line 3—3 of Fig. 2, the feeding slide mechanism also being illustrated in full and dotted lines in the different positions;

Fig. 4 is a bottom plan view of the mechanism shown in Fig. 2;

Fig. 5 is an enlarged sectional view on line 5—5 of Fig. 1;

Fig. 6 is a detail perspective view of the top of the slide member when the latter is removed from the device;

Fig. 7 is a like perspective view of the bottom of the latter member;

Fig. 8 is a detail rear elevation showning the slide, and

Fig. 9 is a perspective view partially in section, showing the cup when removed from the slide.

In this illustrative construction I have shown a container including an improved base 1 and reservoir bottom portion 2 carrying above the latter a reservoir 3 of glass or the like provided with a removable top 4; an improved slide, generally indicated at 5 and carrying at one end an improved removable cup member 6 provided with a handle 7, being disposed between the members 1 and 2 and having improved means associated therewith for insuring equal supplies of ground coffee from the reservoir to the cup 6 whenever the slide is operated and preventing clogging of the slide, all as hereinafter more fully appears.

Referring to the base 1, it will be noted that the same is adapted to be suitably attached to a support as, for example, by suction cups 8 or fastening means 9, or both, as circumstances require. Herein, it will also be observed that this base 1 is of hollow construction and that it comprises spaced legs 10 cooperating to provide a passage 11 therethrough and beneath the slide 5, in which the cup 6 may move as the slide is pushed in or pulled out. Further, it will be observed that these legs 10 have upper portions 12 which are suitably attached as, for example, by screws 13 to the bottom of the reservoir bottom member 2. Herein also, it will be noted that grooves 14 are provided in the edges of these portions 12 to receive and support corresponding edges on the slide 5, while the upper faces of the slide edges engage the bottom of the member 2.

Referring next to the member 2, it will be noted that the same is provided with an inner chamber 15 adapted to receive and support the coffee in the reservoir, and that this chamber is also provided with a central opening or aperture 16 in its bottom and sloping walls 17 leading to the opening 16. As shown, the opening 16 is also provided with an extension or elongation 18 on one end thereof, herein at the back of the opening 16, for a purpose hereinafter described, and this elongation 18 is also provided with an abutment 19 at its extremity, likewise hereinafter more specifically referred to. Attention is further directed to the fact that a transverse abutment 20, likewise hereinafter mentioned, is also provided on the back of the member 2 in alignment with the abutment 19. The upper end of the member 2 is herein also annularly grooved, as at 21, to provide a flanged seat adapted to support and securely position the reservoir member or glass 3, in such manner as to permit the latter to be readily and quickly removed for cleansing whenever desired, by merely lifting the same out of the flanged seat 21.

The slide 5 which is movable in the guide grooves 14 is also of an improved construction. As shown in Figs. 6 and 7, this slide is in the form of a flat plate, preferably of metal, and adapted to slide as hereinafter described, between the members 1 and 2, which are also preferably of metal, with a relatively close running fit in the guides 14. Further, it will be noted that this member 5 herein is provided with a filling aperture 22 of slightly more than semi-circular shape and open at the front and provided with spaced front ends 23 and supporting means 24 on the portions carrying these ends and spaced below the slide. If desired, these portions 24 may be formed on the member 5, but, preferably, as herein, they protrude from the inner edge of separate supporting members 25 suitably attached, as at 26, to the underside of the slide member along the opposite edges of the opening 22 therein. Here, it will also be noted that an upstanding pin 27 suitably attached, as at 28, to the bottom of the slide 5 projects up above the top surface thereof to well within the glass container 3 and is adapted to engage the abutment 19 on the member 2 to establish one limit of movement of the slide, while another pin 29 is provided near the rearmost extremity of the slide, herein on an extension 30, and adapted to engage the abutment 20 on the back of the member 2 to establish the opposite limit of travel of the slide.

Adapted to be operatively associated with the slide 5 is the improved cup or container 6. Herein, this cup is provided with a top flange 31 extending clear around its upper extremity and adapted to be received in the opening 22 and supported on the supports 24. Attention is further directed to the fact that the cup is of such diameter that it projects beyond the ends 23 on the slide 5 and into the space in front of the opening 22. Thus it will be evident that the cup 6 is adapted to be readily inserted in supported position on the members 24, when the slide is projected outward in the dotted line position shown in Fig. 3, by merely inserting the cup angularly, as also shown in dotted lines in that figure, in such manner as to bring the flange 31 on the cup into supported position on the supports 24. In connection with the cup, it will also be noted that the handle portion 7 thereon is herein suitably connected to the flange 31 by forming the same integral therewith as shown in Figs. 1, 2, 3, 4, and 5, or by screws or rivets 32 when the handle portion is a separate piece as shown in Fig. 9. As shown, this handle portion is also preferably provided with a depending portion 33 spaced from the body of the cup, in such manner as to permit the handle to be readily and securely grasped between the fingers, while the thumb overlies the top of the handle, and is disposable on a suitable, preferably slightly dished, thumb receiving surface 34. Here, it will also be observed that the cup 6 is also of variable capacity and provided with an adjustable lower or bottom portion 35, in which the flanged upper portion of the cup is telescopically received. As shown, these portions are also adapted to be removably attached by suitable means as, for example, a set screw 36, so that they may be held in any of a plurality of adjusted positions of the bottom portion 35 relative to suitable graduations 37 which are provided on the upper part of the cup.

As a result of my improved construction so far described, it will be evident that, with the slide 5 in the "in" position thereof shown in Figs. 1, 2, 3 and 4, the inner edge of the flange top 31 of the cup 6 will be disposed coaxially with the opening 16 in the bottom of the member 2. Thus, coffee in the latter can pass down along the sloping side 17 of the member 2 into the cup. The innermost limit of travel of the cup is determined by the engagement of the pin 27 with the abutment 19. When, however, the handle 7 is pulled out, it will be noted that the engagement of the flange 31 on the cup with the walls of the opening 22, will cause the slide also to be pulled out. This will continue until the pin 29 on the slide engages the abutment 20, when it will be observed that the imperforate portion of the slide in rear of the pin 27 closes the opening 16. Further, in this projected position of the slide, it will also be evident that the cup 6 may be readily lifted out angularly from the supports 24 despite the fact that the inner edge of the flange 31 still slightly underlies and is stably supported by the front edge of the member 2. Thus, whenever it is desired to obtain a supply of coffee, it will only be necessary to pull out the cup and slide and remove the cup from the slide, while the return of the cup to the slide and the pushing in of the latter by the cup will return the parts to cup filling position.

Cooperating with the mechanism so far described is also improved mechanism for further insuring the filling of the cup to capacity in the operations of the slide incident to the return of the cup to filling position and the withdrawal of the filled cup for use. Herein, these means include improved means for agitating the coffee in the chamber 15 in the member 2, whereby each time that the slide 5 and cup 6 is moved longitudinally, the ground coffee, and particularly that portion of the same which might otherwise adhere to glass 3 or the walls 17 of the chamber 15, is caused to be dislodged therefrom, in such manner as to insure capacity filling of the cup 6. Here it will be observed that I have provided a recessed portion 38 in one sidewall of the chamber 15, and that I have mounted in this recess 38, an improved actuator, generally indicated at 39, for a loosely coiled spring 40 disposed around the chamber 15 closely adjacent the walls thereof and have also provided improved means for actuating both the member 39 and spring 40 whenever the slide 5 is actuated.

Referring to the actuator 39, it will be noted that the same is herein in the form of two strips of spring material disposed close together and having an open connecting portion 41 on one end disposed in the recess 38 and positioned therein by a holding member or plate 42 suitably attached to the back wall of the recess as, for example, by screws 43. The other end of the actuator 39 extends out over the axis of the chamber 15 and into the path of the pin 27. Further, it will be observed that this end of the spring is provided with a plurality of spaced bent portions 43a adapted to receive between the same the arms of a U shaped vertical extension 44 on the spring 40. Moreover, it will be noted that clamping means are provided in the form of oppositely disposed clamping plates 45, recessed as at 46, to receive the bent portions 43a on the spring 39, and clamp this spring on the portion 44, these plates 45 herein being suitably connected by connecting means as, for example, rivets 47 passing through the plates 45 and the spring 39.

Thus, when the portion 44 on one extremity of the spring 40 is clamped as described, and this portion 44 is connected to the bottom coil of the spring 40 by a portion 48, it will be evident that any vibratory movement of the free end of the actuator 39 will actuate the spring 40, in such manner as to cause the same to move relative to the walls 17 of the chamber 15 and thus dislodge and cause to flow freely downward, any coffee tending to remain lodged on the walls 17. Further, it will be evident that, since the extremities of the spring members 39 extend over the axis of the opening 16 in the bottom of the chamber 15 and the pin 27 also moves across the axis, this pin will alternately engage the outer extremities of different plates 45 and thus cause the spring actuator 39 to be flexed or vibrated in opposite directions as the slide 5 moves into open or closed positions. Here also, it will be noted that further to facilitate the downward movement of the coffee in the chamber 15 and also in the reservoir 3, the pin 27 is also elongated in such manner that the upper end of the same extends up through the chamber 15 and into the reservoir 3, all so that in the relatively long reverse movements of the pin the latter acts as an effective dislodging means adapted to assist in assuring a free flow of coffee to the cup 6.

Operatively associated with the structure described is also improved means for preventing clogging of the guides and supports for the slide 5, by the finely ground coffee which otherwise tends to find its way onto these guides and supports. Here, it will be observed that the supporting flanges for the edges of the slide 5 are in the form of a plurality of longitudinally spaced lug portions 51 adapted to permit coffee thereon to escape over the edges of these portions as the slide is moved. Here, attention is further directed to the fact that in the slide 5, spaced longitudinal series of openings 52, herein in the form of round holes, are also provided which are so disposed as to move longitudinally just inside the opposite inner edges of these portions 51, in such manner as to cause the discharge of any coffee which seeps laterally from the opening 16 between the bottom of the member 2 and the top surface of the slide 5. In connection with these openings, attention is further directed to the fact that the bottom surface of the member 2 is also grooved or recessed as at 53, to form long narrow grooves disposed adjacent the edges of the slide and overlying the top thereof longitudinally of the portions 51. It will also be noted that these grooves open out near the rear of the device into wider recessed portions 54 above the slide at the rear of the member 2 and on opposite sides of the abutment 20 thereon, all in such manner as, with the openings 52 and the moving slide 5, to insure freedom from binding and the effective discharge of any coffee which would otherwise interfere with free movement of the slide.

In the use of my improved construction, it will be evident that the cup 6 will be caused to be filled flush with the top of the same each time that the cup is pushed into filling position beneath the opening 16. In my improved construction, not only is a maximum opportunity provided for the coffee to slide down the walls 17 of the chamber 15 into the cup 6, but the flow of the coffee into the cup 6 is insured by the action of the spring 40 and pin 27 together with the spring actuator 39, all of which function to prevent any lodgment of coffee such as might interfere with the complete filling of the cup. Thus, each time that the pin 27 moves in, it engages the spring actuator 39 and forces the same ahead of it while tensioning the spring. As a result, after the pin has passed, the spring actuator moves back into the path of the pin 40 so that it is ready to be actuated subsequently by the return of the pin. Thus, the spring 40 is actuated during each inward and outward movement of the pin in such manner as to cause coffee to fall into the cup in the "in" position of the latter, or collect on the imperforate surface of the slide which closes the opening 16 in the "out" position of the slide, all in such manner as to fill the cup by the time the same reaches its full "in" position and certainly before the cup can be withdrawn for use. At the same time, it will be evident that the slides and supports will be kept free from accumulations of coffee, which would otherwise interfere with the free movement of the parts or the proper location of the cup 6 on its supports.

As a result of my improved construction, it will be evident that an operator, no matter how hurried or careless he may be, is assured of a full cup of ground coffee each time that my dispenser is operated. Thus, all necessity for repeatedly operating the dispenser to insure a full cup is eliminated. Further and more important, the quantity of coffee removed from the dispenser and used in the various coffee makers is maintained constant, in such manner as to insure a wholly new uniformity of quantity heretofore not obtainable, since all operators, including the hurried or careless operators, are assured of a full cup each time that the dispenser is used. Attention is further directed to the convenience of the insertion and removal of the cup 6 in its supports 24. Also, in my improved construction, the movement of the slide 5 is but a natural continuation of the movement required to insert the cup on the supports 24, while the separation of the cup from these supports is also but a natural continuation of the withdrawal movement of the cup and slide. Thus, it is possible in my improved construction not only to use the same with great facility but very rapidly, while the action of the coffee agitating or dislodging means is also such as to be effective irrespective of the speed of operation of the same. Attention is also directed to the fact that due to the provision of my improved means for preventing binding of the slide, any possible accumulation of coffee in the slides is minimized, while access to the slides is, of course, also made possible when desired through the various apertures during cleaning. These and other advantages of my improved construction will, however, be clearly apparent to those skilled in the art.

While I have in this application specifically described one embodiment which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:—

1. In a dispensing device, a container having a bottom aperture, a controlling slide for said container having an aperture movable across said bottom aperture, and a dispensing cup forming a part of said device removably mounted in said slide aperture and thereby interlocked with said slide so as to move the slide in opposite directions and in one position of said slide receiving the discharge from said bottom aperture.

2. In a dispensing device, a container having a bottom aperture, a controlling slide for said container having an aperture movable across said bottom aperture, and a dispensing cup forming a part of said device removably mounted in said slide aperture and thereby interlocked with said slide so as to move the slide in opposite directions and in one position of said slide receiving the discharge from said bottom aperture, said slide having an opening in its front end communicating with the aperture therein and said cub being insertable and removable through said opening.

3. In a dispensing device, a container having a bottom aperture, a controlling slide for said aperture having in communication with one end thereof an opening in the form of a segment larger than a semicircle, and a dispensing cup removably mounted in and interlocked with said slide by said opening and in one position of said slide receiving the discharge from said bottom aperture.

4. In a dispensing device, a container having a bottom aperture, a controlling slide having an aperture movable across said bottom aperture, and a dispensing cup removably mounted in said slide aperture and in one position of said slide receiving the discharge from said bottom aperture, said slide having adjacent the periphery of its aperture a cup support and said cup having a flange supported on said support.

5. In a dispensing device, a container for granular material having a bottom aperture, a controlling slide slidable across said aperture, guides on said container embracing the side edge portions of said slide, and means comprising rows of small ports extending through the edges of said slide adjacent said guides for inhibiting the accumulation of the material in the guides.

6. In a dispensing device, a container having a bottom aperture, a controlling slide slidable in said container across said aperture, and guides on said container embracing the side edge portions of said slide, said guides having grooved portions extending lengthwise above the slide and also including a plurality of longitudinally spaced luglike supports supporting the edges of said slide and disposed flatwise beneath said slide.

7. In a dispensing device, a container having a bottom aperture, a controlling slide slidable in said container across said aperture, guides in said container for said slide, and means in said guides and in the adjacent edges of said slide for preventing the accumulation of material in said guides including cooperating recess forming means in the container wall above said slide and in said guide below said slide and including apertures in the edge portions of said slide.

8. In a dispensing device, a container having a bottom aperture, dispensing means associated therewith including a controlling slide, a coiled member in said container for scraping the wall of said device and for dislodging material adhering to the container walls, and means operable from said slide for causing translatory scraping movement of said member.

9. In a dispensing device, a container having a bottom aperture, dispensing means associated therewith including a controlling slide, an agitator comprising a coiled member extending around the container wall in substantial wall scraping contact therewith, and means actuated from said slide for moving said member back and forth in a direction generally transversely of the container.

10. In a dispensing device, a container having a bottom aperture, dispensing means associated therewith including a controlling slide, a coiled member disposed in said container in substantial contact with the side wall thereof and operative connections for said member actuated upon movement of said slide to impart to said member bodily and generally laterally wall scraping movement in opposite directions.

11. In a dispensing device, a container having a bottom aperture, dispensing means associated therewith including a controlling slide, a coiled spring disposed in said container above said aperture, and a resilient actuator for said spring carried by said container and operated upon movement of said slide.

12. In a dispensing device, a container having a bottom aperture, dispensing means associated therewith including a controlling slide, a coiled spring conforming to the walls of said container above said aperture, a resilient carrier for said spring, and a member movable with said slide and flexing said carrier as said slide is operated.

13. In a dispensing device, a container having a bottom aperture, dispensing means associated therewith including a controlling slide, a coiled spring disposed in said container adjacent the walls thereof above said aperture, and operative connections to cause wall scraping movement of said spring in opposite directions upon movement of said slide from "in" position to "out" position and vice versa.

14. In a dispensing device, a container having a bottom aperture, dispensing means associated therewith including a controlling slide, an agitator comprising a coil disposed in contact with the walls of said container above said aperture, and means operable from said slide for shifting said coil in the direction of movement of said slide to clear the walls of said container above said aperture.

15. In a dispensing device, a container having a bottom aperture, dispensing means associated therewith including a controlling slide, an agitator disposed in said container above said aperture, and means for operating said agitator upon operation of said slide including a cooperating agitator carried on said slide and projecting upward into said container.

16. In a dispensing device, a container having a discharge aperture, a controlling slide plate for said aperture, and a rigid dispensing cup constituting an actuator for the plate having means by which said cup is mounted and said plate is engaged for moving said plate in opposite directions relatively to said aperture.

17. In a dispensing device, a container having a discharge aperture, a controlling slide plate for said aperture, and a removably mounted dispensing cup by which said plate is moved in opposite directions relatively to said aperture, said plate having an opening by which it is interlocked with the cup and through which the cup is filled and from which the cup is withdrawable lengthwise of the slide.

18. In a dispensing device, a container having a discharge aperture, a ported slide plate controlling said aperture, a removably mounted dispensing cup, and means of detachable connection between the mouth portion of said cup and said plate adjacent the margin of the port in the plate for preventing the downward displacement of the cup but permitting the lifting thereof.

19. In a dispensing device, a container having a discharge aperture, a slide controlling said aperture and having a discharge opening, and a cup removably carried by said slide in said opening and having a handle constituting an actuating member for said slide.

20. In a dispensing device, a container having a discharge aperture, a slide plate controlling said aperture and having a discharge opening, and a dispensing cup removably positioned in said opening, said opening being shaped to cause interlock of the cup and plate so that the plate is actuated by movement of the cup and said opening leading to an end of the plate so that the cup is withdrawable from the plate longitudinally of the plate.

21. In a dispensing device, a container having a bottom aperture, dispensing means associated therewith including a controlling slide and a rigid dispensing cup carried thereby comprising manual operating means for the slide, said cup receiving material through said bottom aperture in the "in" position of said slide and having means for enabling its removal from the slide only when said slide is moved reversely into its "out" position, and means for insuring filling of said cup operative by said slide.

22. In a dispensing device, a receptacle having a discharge aperture, a controlling slide plate having an opening cooperating with said aperture, and a dispensing cup said slide and cup having means interlockingly engaging said cup with said plate in said opening upon manual movement of the cup generally endwise of the slide and said cup being thereupon movable to move the slide into cup filling position and thereafter movable to withdraw the slide and upon further movement to remove the cup from the slide.

23. In a dispensing device for granular material, a receptacle, a discharge controlling slide plate therefor having an opening, a dispensing cup forming a part of said device, removably mounted and engageable with said plate in said opening, and a handle on said cup by which the cup is manipulated to move the plate relatively to the receptacle.

24. In a dispensing device, a receptacle having a discharge aperture, a controlling slide plate for said aperture having a discharge opening, and a dispensing cup forming a part of said device and having a supporting rim removably mounted on and engaging the plate adjacent said opening, said plate being movable in opposite directions relative to the receptacle aperture by the cup.

25. In a dispensing device, a receptacle having a discharge aperture, a controlling slide plate having an opening cooperating with said aperture, and a dispensing cup removably and interlockingly engageable with said plate in said opening when the slide plate is in an "out" position, said cup being operative of the slide plate and interlocked therewith in an "in" position.

26. In a dispensing device, a container having a discharge aperture, a ported slide plate controlling said aperture and slidable under said container, a removably mounted dispensing cup, means of detachable connection and support between the mouth portion of said cup and said plate adjacent the margin of the port in the plate, and stop means on said slide for stopping the plate in its "out" position with one edge of the cup under the container and for permitting withdrawal of the cup only by a slight vertical movement and by movement lengthwise of the slide.

27. In a dispensing device, a container having a discharge aperture, a controlling slide plate having an opening cooperating with said aperture, a dispensing cup, means associated with said cup for interlockingly engaging and supporting said cup in said opening, said cup being operative of the plate, and means for adjusting the capacity of said cup independently of said interlocking means.

FRANK E. WOLCOTT.